(12) United States Patent
Jung et al.

(10) Patent No.: US 11,885,033 B2
(45) Date of Patent: Jan. 30, 2024

(54) ELECTRODE STRUCTURE FOR ELECTROLYZER

(71) Applicant: TECHWIN CO., LTD., Cheongju-si (KR)

(72) Inventors: Boong Ik Jung, Cheongju-si (KR); Jung Sik Kim, Sejong-si (KR); Tae Shin Cho, Cheongju-si (KR); Dong Hyuck Choi, Cheongju-si (KR); Tae Woo Kim, Cheongju-si (KR)

(73) Assignee: TECHWIN CO., LTD., Cheongju-si (KR)

( * ) Notice: Subject to any disclaimer, the term of this patent is extended or adjusted under 35 U.S.C. 154(b) by 0 days.

(21) Appl. No.: 18/062,988

(22) Filed: Dec. 7, 2022

(65) Prior Publication Data

US 2023/0106625 A1   Apr. 6, 2023

Related U.S. Application Data

(63) Continuation of application No. PCT/KR2021/007712, filed on Jun. 21, 2021.

(30) Foreign Application Priority Data

Aug. 19, 2020  (KR) .................. 10-2020-0103860
Oct. 13, 2020  (KR) .................. 10-2020-0131649

(51) Int. Cl.
| | | |
|---|---|---|
| C25B 11/02 | (2021.01) | |
| C25B 9/67 | (2021.01) | |
| C25B 9/19 | (2021.01) | |
| C25B 1/46 | (2006.01) | |
| C02F 1/467 | (2023.01) | |
| C02F 1/461 | (2023.01) | |
| C25B 9/13 | (2021.01) | |

(52) U.S. Cl.
CPC ............ *C25B 11/02* (2013.01); *C02F 1/4674* (2013.01); *C02F 1/46109* (2013.01); *C25B 1/46* (2013.01); *C25B 9/13* (2021.01); *C25B 9/19* (2021.01); *C25B 9/67* (2021.01); *C02F 2201/46115* (2013.01)

(58) Field of Classification Search
CPC ........................................................ C25B 9/13
USPC ......................................... 204/257, 258, 266
See application file for complete search history.

(56) References Cited

U.S. PATENT DOCUMENTS 4,069,129 A * 1/1978 Sato .......................... C25B 1/46
                                                    204/266
4,233,146 A * 11/1980 Rothmayer ......... H01M 8/0273
                                                    204/263

(Continued)

FOREIGN PATENT DOCUMENTS

JP    2004-143481 A    5/2004
KR   10-2006-0096843 A   9/2006

(Continued)

OTHER PUBLICATIONS

International Search Report issued in PCT/KR2021/007712; dated Sep. 9, 2021.

*Primary Examiner* — Harry D Wilkins, III
(74) *Attorney, Agent, or Firm* — Studebaker & Brackett PC

(57) ABSTRACT

Disclosed are an electrode structure including: an electrode plate; and a flow path guide disposed on one side of the electrode plate along the circumference of the electrode plate, and an electrolyzer including the electrode structure.

6 Claims, 4 Drawing Sheets

(56) References Cited

U.S. PATENT DOCUMENTS

| | | | | |
|---|---|---|---|---|
| 4,274,939 A * | 6/1981 | Bjaareklint | ............... | C25B 9/77 204/263 |
| 4,339,324 A * | 7/1982 | Haas | .................. | C25B 9/77 204/257 |
| 4,425,215 A * | 1/1984 | Henes | ................. | C25B 9/73 204/278 |
| 4,432,858 A * | 2/1984 | Schmitt | .............. | C25B 9/73 204/279 |
| 4,464,243 A * | 8/1984 | Woolhouse | ............. | C25B 11/02 204/290.13 |
| 4,758,322 A * | 7/1988 | Sioli | .................. | C25B 9/75 204/255 |
| 4,950,370 A * | 8/1990 | Tarancon | ................. | C25B 9/70 204/255 |
| 6,080,290 A * | 6/2000 | Stuart | ................. | H01M 8/2483 204/255 |
| 6,117,287 A * | 9/2000 | Molter | ............. | C25B 9/19 204/255 |
| 6,878,244 B2 * | 4/2005 | Sioli | .................. | C25B 9/77 204/269 |
| 2002/0100681 A1 * | 8/2002 | Kirk | .................. | C25B 9/73 204/290.01 |
| 2010/0078317 A1 * | 4/2010 | Bourgeois | ................. | C25B 9/70 204/253 |
| 2013/0157097 A1 * | 6/2013 | Kampanatsanyakorn | .................. | H01M 8/1009 429/105 |
| 2014/0202849 A1 * | 7/2014 | Halterman | ............ | C02F 1/4618 204/263 |
| 2016/0049673 A1 * | 2/2016 | Fukushima | ....... | H01M 8/04186 324/426 |

FOREIGN PATENT DOCUMENTS

| | | |
|---|---|---|
| KR | 10-2012-0014478 A | 2/2012 |
| KR | 10-2012-0019656 A | 3/2012 |
| KR | 10-1944730 B1 | 2/2019 |

* cited by examiner

ELECTRODE STRUCTURE FOR ELECTROLYZER

CROSS-REFERENCE TO RELATED APPLICATIONS

This application is a continuation of International Patent Application No. PCT/KR2021/007712, filed on Jun. 21, 2021, which claims priority to and the benefit of Korean Patent Application No. 10-2020-0103860, filed on Aug. 19, 2020 and Korean Patent Application No. 10-2020-0131649, filed on Oct. 13, 2020, the disclosure of which is incorporated herein by reference in its entirety.

TECHNICAL FIELD

The present invention relates to an electrode structure for an electrolyzer, and an electrolyzer including the same.

BACKGROUND ART

Sodium hypochlorite (NaOCl) is applied to various fields such as treatment of waterworks, sewage and wastewater, seawater electrolysis, ballast water treatment, sterilization and disinfection of agricultural food and food materials.

Such sodium hypochlorite is prepared by using a low-concentration sodium hypochlorite production system and a high-concentration sodium hypochlorite production system depending on concentration of sodium hypochlorite.

Low-concentration sodium hypochlorite having concentration of 0.4 to 1.0% is obtained by passing salt water through a diaphragm-free electrolyzer performing a contact-type electrode reaction. High-concentration sodium hypochlorite having concentration of 2% or more is obtained by reacting chlorine gas and caustic soda generated in a diaphragm-type electrolyzer in which a cathode and an anode are partitioned by a diaphragm.

There is a diaphragm-type electrolyzer using salt water which uses components made of a fluorine-based resin to couple and assemble an anode and a cathode. The fluorine-based resin has excellent corrosion resistance, but is easily deformed by heat, and thus may cause leakage of liquid and/or gas during long-term operation. Therefore, in order to solve the above problem and simplify facilities, an electrolyzer made of only a metal material may be configured with only a metal material.

FIG. 1 illustrates a conventional electrolyzer. Referring to FIG. 1, the conventional electrolyzer for preparing sodium hypochlorite may include a cathode chamber 1, an anode chamber 3, and a diaphragm 2 for partitioning the cathode chamber and the anode chamber. The cathode chamber includes a cathode tank (not illustrated) for circulating a cathode product, and the anode chamber includes an anode tank (not illustrated) for circulating an anode product. The cathode tank and the anode tank respectively separate a gas product and a liquid product. As described above, the conventional electrolyzer circulates the cathode product and the anode product to quickly discharge gas generated in the electrolyzer and absorb heat generated in the electrolyzer through an external heat exchanger.

Moreover, chlorine gas and caustic soda generated in each of the anode chamber and the cathode chamber are moved to a reaction tank (not illustrated) via the anode tank and the cathode tank and reacted in the reaction tank, thereby generating sodium hypochlorite.

Furthermore, the conventional electrolyzer includes a caustic soda tank and an injection device for injecting caustic soda into the reaction tank and/or a sodium hypochlorite tank to maintain and stably store the generated sodium hypochlorite in pH of 12 or more, and further includes a cooling device for suppressing generation of by-products during storage of sodium hypochlorite.

As described above, the conventional electrolyzer for preparing sodium hypochlorite has several disadvantages in that anode water discharged from the anode tank contaminates surrounding environment, and in that it requires lots of maintenance fees due to a complicated configuration of a plurality of facilities, e.g., tanks, pipes, and the likes, for stably storing the manufactured high-concentration sodium hypochlorite. In addition, since chlorine gas, hydrogen gas, caustic soda, and the like generated through electrolysis are dangerous materials designated as harmful chemicals, the conventional electrolyzer may cause accidents, damages, or unnecessary risks in a case in which such harmful chemicals are transferred and circulated through a pipe exposed to the outside.

DISCLOSURE

Technical Problem

Accordingly, the present invention has been made in view of the above-mentioned problems occurring in the related art, and it is an object of the present invention to provide an electrode structure for an electrolyzer, and an electrolyzer including the same, which can generally simplify the electrolyzer and facilities including the electrolyzer, and minimize pipes for transferring and/or circulating materials from being exposed to the outside, thereby being convenient in maintenance and management, and reducing risks due to accidents or damages.

Technical Solution

To accomplish the above-mentioned objects, according to the present invention, there is provided an electrode structure including: an electrode plate; and a flow path guide disposed on one side of the electrode plate along the circumference of the electrode plate.

According to an embodiment, the electrode structure further includes: a cooking jacket disposed on the other side of the electrode plate.

According to an embodiment, the electrode plate and the cooling jacket are made of the same material.

According to an embodiment, the electrode structure further includes: a lower through hole passing through the electrode plate and the flow path guide at a lower portion thereof; and a first flow path allowing the flow path guide and the lower through hole to communicate with each other.

According to an embodiment, the electrode structure further includes: an upper through hole passing through the electrode plate and the flow path guide at an upper portion thereof; and a second flow path allowing the flow path guide and the upper through hole to communicate with each other.

According to an embodiment, the electrode structure further includes: a reaction unit in which the flow path guide is not provided on one side of the electrode plate; and a third flow path connecting the flow path guide.

According to an embodiment, the third flow path is provided in at least one of a lower inner wall, a side inner wall, and an upper inner wall of the flow path guide.

According to an embodiment, an area ratio of the third flow path to the inner wall of the flow path guide is 0.05 to 0.95.

According to an embodiment, the reaction unit includes: an activation unit in which a liquid-phase material introduced into the reaction unit is electrolyzed; and an inactivation unit located above the activation unit so that a gas-phase material generated from the activation unit stays, and wherein a ratio of the area of the activation unit to the area of the reaction unit is 0.1 to 0.9.

In another aspect of the present invention, there is provided an electrolyzer including: an electrode structure; and a diaphragm disposed to face one side of the electrode plate.

Advantageous Effects

As described above, the electrode structure according to an aspect of the present invention includes: the electrode plate; and the flow path guide disposed on one side of the electrode plate along the circumference of the electrode plate to provide inflow and outflow paths of materials for the electrode structure to generally simplify the electrolyzer and facilities including the electrolyzer and minimize pipes for transferring and/or circulating materials from being exposed to the outside, thereby being convenient in maintenance and management, and reducing risks due to accidents or damages.

The effects of the present disclosure are not limited to the above-mentioned effects, and other effects, which are not specifically mentioned herein, will be clearly understood by those skilled in the art from the following description.

MODE FOR INVENTION

Figure 1:
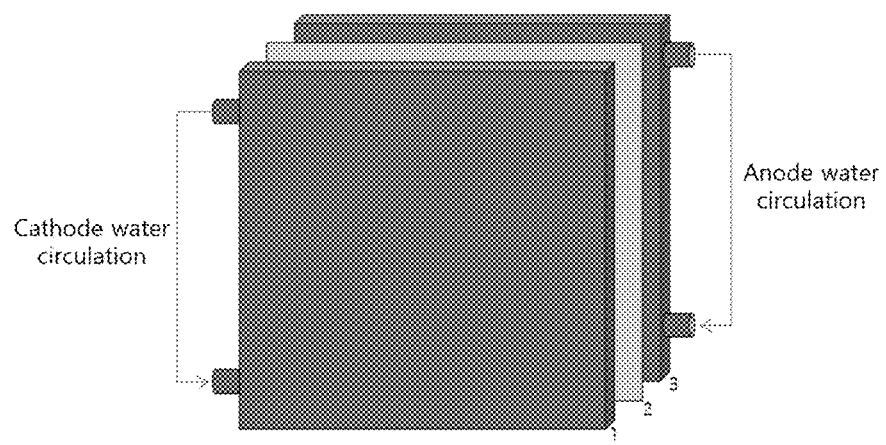
FIG. 1 is a schematic diagram of a conventional electrolyzer.

Hereinafter, the present invention will be described in detail with reference to the accompanying drawings. However, embodiments of the present invention may be implemented in several different forms and are not limited to the embodiments described herein. In addition, parts irrelevant to description are omitted in the drawings in order to clearly explain embodiments of the present invention. Similar parts are denoted by similar reference numerals throughout this specification.

Throughout this specification, when a part is referred to as being "connected" to another part, this includes "direct connection" and "indirect connection" via an intervening part. Also, when a certain part "includes" a certain component, other components are not excluded unless explicitly described otherwise, and other components may in fact be included.

Hereinafter, embodiments of the present invention will be described in detail with reference to the accompanying drawings.

Figure 2A:
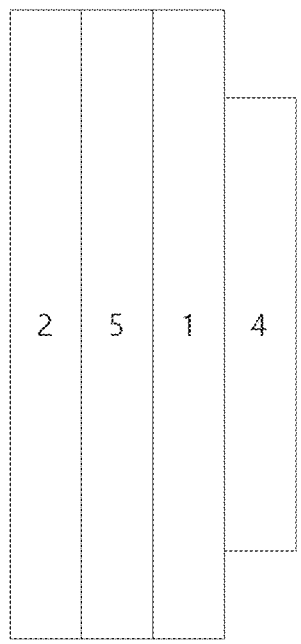
FIGS. 2A and 2B are diagrams illustrating an electrode structure according to an embodiment of the present invention.
Figure 2B:
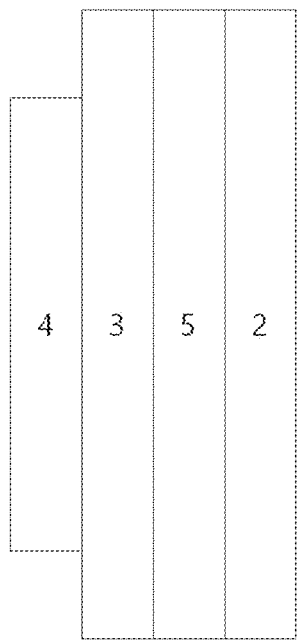

FIGS. 2A and 2B are diagrams illustrating an electrode structure according to an embodiment of the present invention. Referring to FIGS. 2A and 2B, the electrode structure according to an aspect of the present disclosure may include: an electrode plate 1 or 3; and a flow path guide 5 provided on one side of the electrode plate along the circumference of the electrode plate, and may further include a cooling jacket 4 provided on the other surface of the electrode plate.

The electrode plate may be an anode plate 3 or a cathode plate 1. In a case in which the electrode plate is the anode plate (FIG. 2B) and in a case in which the electrode plate is the cathode plate (FIG. 2A), the cooling jacket 4 and the flow path guide 5 based on the electrode plate may be reversed with respect to each other.

In the electrolyzer including the electrode structure, the electrode plate may be made of a metal material, for example, titanium, stainless steel, or the like.

The flow path guide 5 may be provided on one side of the electrode plate 1 or 3 along the circumference of the electrode plate 1 or 3, and may have a hollow structure in which a material may move along the inside of the electrode plate 1 or 3. In addition, a through hole and a flow path formed in the flow path guide 5 may allow raw materials to flow into an inner region, in which the flow path guide 5 is not provided, of one side of the electrode plate 1 or 3, and may discharge an electrolysis product generated in the inner region to the outside.

The cooling jacket 4 may be provided on one side of the electrode plate 1 or 3 so that cooling water immediately absorbs heat generated by an electrolytic reaction. Accordingly, the present invention can simplify facilities since not requiring a heat exchanger disposed on an anode product circulation line and/or a cathode production circulation line for controlling heating in the conventional electrolyzer.

The electrode plate 1 or 3 and the cooling jacket 4 may be made of the same material. The cooling jacket 4 is provided on one side of the electrode plate 1 or 3. In a case in which the electrode structure is coupled in multiple stages, the cooling jacket is interposed between the cathode plate 1 and the anode plate 3. Accordingly, it is preferable to have predetermined conductivity so that the cathode plate 1 and the anode plate 3 are not insulated from each other.

The cooling jacket 4 may be coupled to at least one side of the cathode plate 1 and/or the anode plate 3 by welding, and may be made of the same material as the cathode plate 1 and/or the anode plate 3. The cooling jacket 4 coupled by welding may basically absorb and remove heat generated in the electrolyzer, and at the same time, electrically connect the cathode plate 1 and the anode plate 3.

Meanwhile, the cooling jacket 4 may be provided to partially and/or entirely cover an area where an electrolytic reaction occurs in the electrode plate 1 or 3, that is, a reaction unit and/or an activation unit to be described later.

Figure 3A:
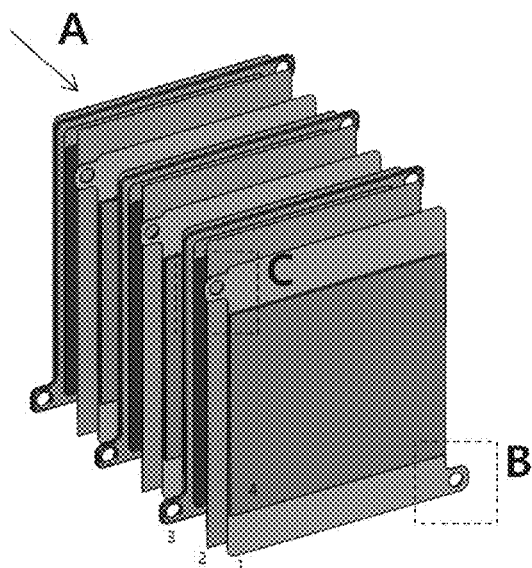
FIGS. 3A and 3B are diagrams illustrating a form in which the electrode structure according to an embodiment of the present invention is coupled in multiple stages.
Figure 3B:
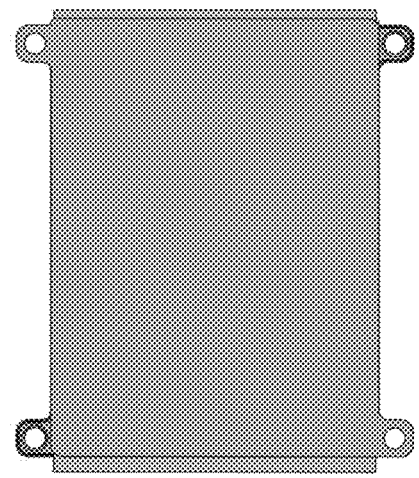

FIGS. 3A and 3B are diagrams illustrating a form in which the electrode structure according to an embodiment of the present invention is coupled in multiple stages. Referring to FIG. 3A, unit structures each including the components in order of "the cooling jacket 4-the cathode plate 1-the flow path guide 5-the diaphragm 2-the flow path guide 5-the anode plate 3" may be coupled in multiple stages to constitute an electrolyzer.

Figure 4:
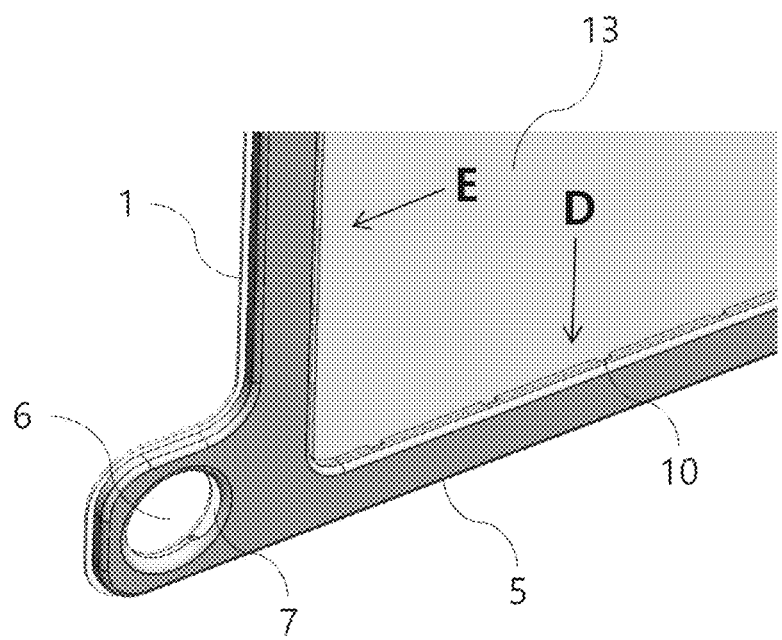
FIG. 4 is a diagram illustrating a rear surface of an area B of FIG. 3A.

FIG. 4 is a diagram illustrating a rear surface of an area B of FIG. 3A. Referring to FIG. 4, the electrode structure may further include: a lower through hole 6 passing through the electrode plate 1 and the flow path guide 5 at a lower portion thereof; and a first flow path 7 allowing the flow path guide 5 and the lower through hole 6 to communicate with each other. For example, the first flow path 7 may allow the inside of the flow path guide 5 and the side wall of the lower through hole 6 to communicate with each other.

FIG. 3B is a plan view of the electrolyzer viewed in a direction A of FIG. 3A. Referring to FIG. 3B, the unit structures may be coupled in multiple stages such that the lower through hole of the cathode plate 1 and the lower through hole of the anode plate 3 overlap each other.

Raw materials may be introduced into the electrolyzer through the lower through holes 6 of the cathode plate 1 and the anode plate 3. Specifically, the raw materials may be introduced into the electrolyzer substantially in a vertical direction to the electrode plate 1 or 3 through the lower through hole 6. Such raw materials may be introduced into the flow path guide 5 through the first flow path 7 which allows the inside of the flow path guide 5 and the side wall of the lower through hole 6 to communicate with each other.

Figure 5:
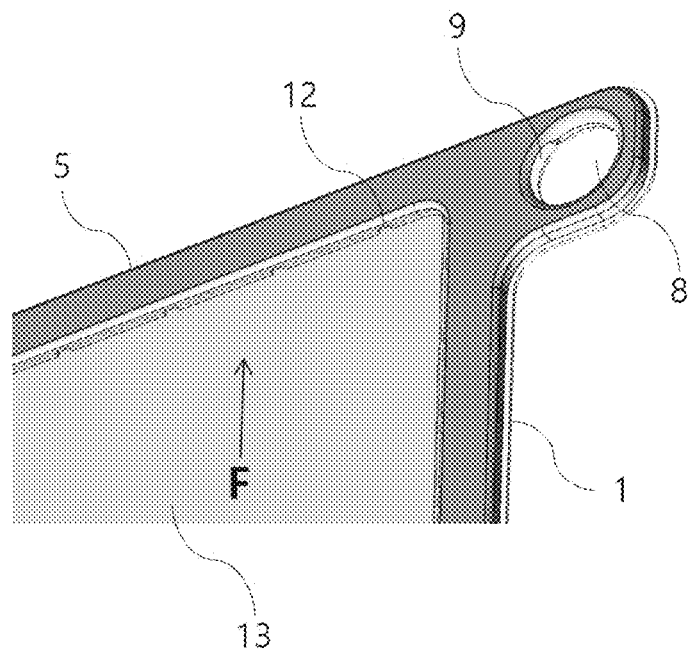
FIG. 5 is a diagram illustrating a rear surface of an area C of FIG. 3A.

FIG. 5 is a diagram illustrating a rear surface of an area C of FIG. 3A. Referring to FIG. 5, the electrode structure may further include: an upper through hole 8 passing through the electrode plate 1 and the flow path guide 5 at an upper portion thereof; and a second flow path 9 allowing the flow path guide 5 and the upper through hole 8 to communicate with each other. For example, the second flow path 9 may allow the inside of the flow path guide 5 and the side wall of the lower through hole 6 to communicate with each other.

Referring to FIG. 3B, the unit structures may be coupled in multiple stages such that the upper through hole of the cathode plate 1 and the upper through hole of the anode plate 3 overlap each other.

An anode product and a cathode product may be respectively discharged from the electrolyzer through the upper through holes 8 of the anode plate 1 and the cathode plate 3. Specifically, electrolysis product, namely, the anode product and the cathode product, may be discharged out of the electrolyzer substantially in the vertical direction to the electrode plate through the upper through hole. The anode product and the cathode product are discharged through the upper through hole 8 in an area direction of the electrode plate through the second flow path 9 allowing the side wall of the upper through hole 8 and the flow path guide 5 to communicate with each other, and then, are transferred to subsequent facilities disposed downstream.

The electrode structure may further include: a reaction unit 13 in which the flow path guide is not provided on one side of the electrode plate 1, and a third flow path connecting the flow path guide.

The third flow path may be provided on an inner wall of the flow path guide 5 toward the reaction unit. The third flow path may connect the inside of the flow path guide 5 and the reaction unit 13 to provide a path through which a material can move between the flow path guide and the reaction unit.

The third flow path may be provided in at least one of a lower inner wall, a side inner wall, and an upper inner wall of the flow path guide.

Figure 6A:
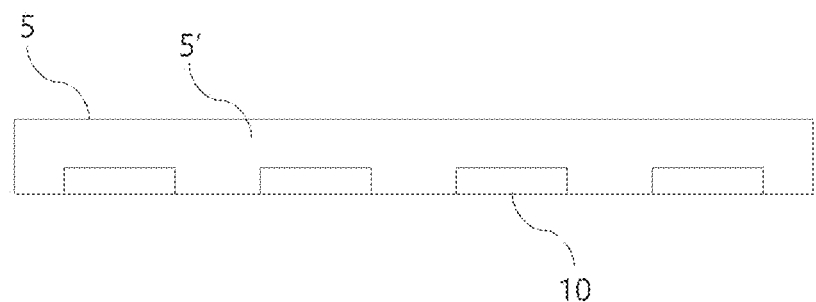
FIGS. 6A and 6B are plan views of a lower inner wall and a side inner wall of a flow path guide viewed in directions D and E of FIG. 4.
Figure 6B:
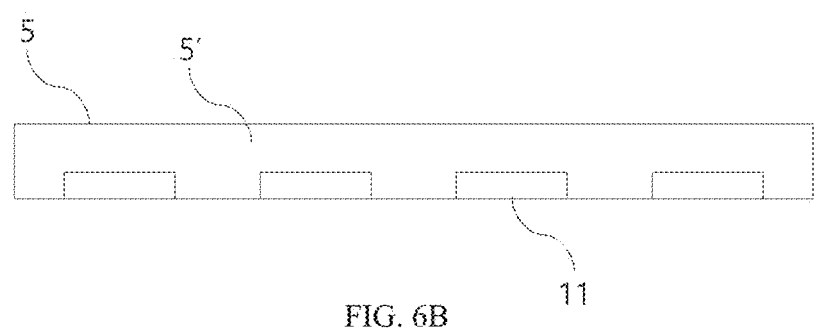

FIGS. 6A and 6B are plan views of a lower inner wall and a side inner wall of a flow path guide viewed in directions D and E of FIG. 4.

Referring to FIG. 6A, two or more third flow paths 10 may be provided in the lower inner wall 5' to be spaced apart at a predetermined interval, and thus, a material may uniformly move between the inside of the flow path guide 5 and an activation unit, which will be described later, in the reaction unit 13. Referring to FIG. 6B, two or more third flow paths 11 may be provided in the side inner wall 5' to be spaced apart at a predetermined interval, and thus, a material may uniformly move between the inside of the flow path guide 5 and the reaction unit 13.

Figure 7:
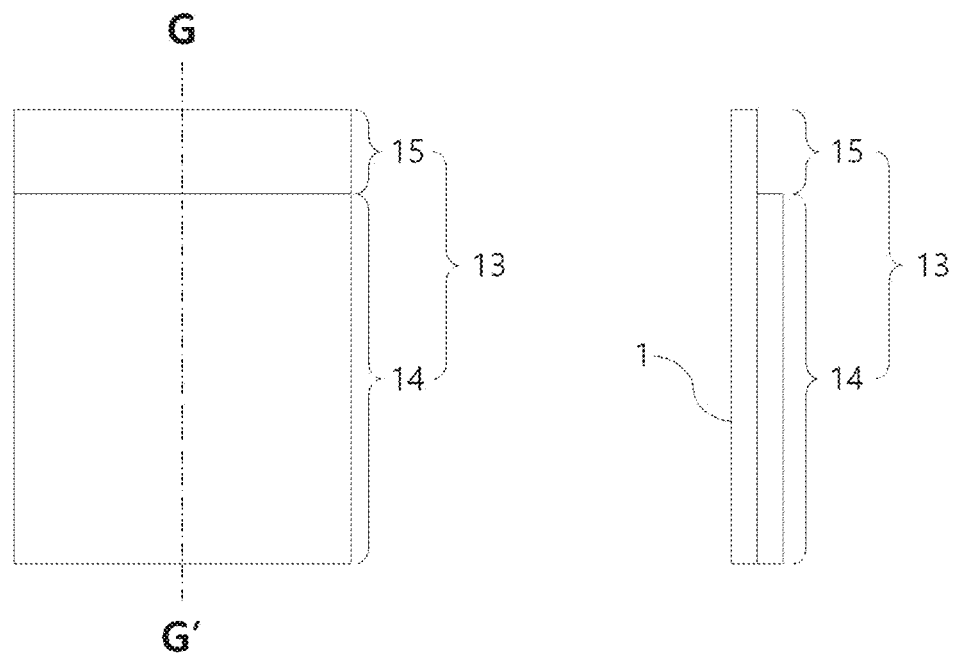
FIG. 7 is a plan view of an upper inner wall of the flow path guide viewed in a direction F of FIGS. 6A and 6B.

FIG. 7 is a plan view of an upper inner wall of the flow path guide viewed in a direction F of FIGS. 6A and 6B.

Referring to FIG. 7, two or more third flow paths 10 may be provided in the lower inner wall 5' to be spaced apart at a predetermined interval, and thus, a material may uniformly move between the inside of the flow path guide 5 and an inactivation unit, which will be described later, in the reaction unit 13. The electrolysis product moving into the flow path guide 5 through the third flow path 12 disposed on the upper inner wall 5' of the flow path guide 5 may be discharged to the outside of the electrolyzer through the second flow path 9 and the upper through hole 8.

An area ratio of the third flow paths 10, 11 and 12 to the inner wall 5' of the flow path guide is 0.05 to 0.95, preferably, 0.1 to 0.9, more preferably, 0.2 to 0.8.

If the ratio of the area of the third flow paths 10, 11, and 12 to the area of the inner wall 5' of the flow path guide is less than 0.05, 0.1, and 0.2, it may hinder movement of a material between the inside of the flow path guide 5 and the reaction unit 13. If the ratio of the area exceeds 0.95, 0.9 and 0.8, it is difficult to control the movement of the material and the balance of the material according to the movement, and it may deteriorate durability of the flow path guide 5.

Figures 8A, 8B:
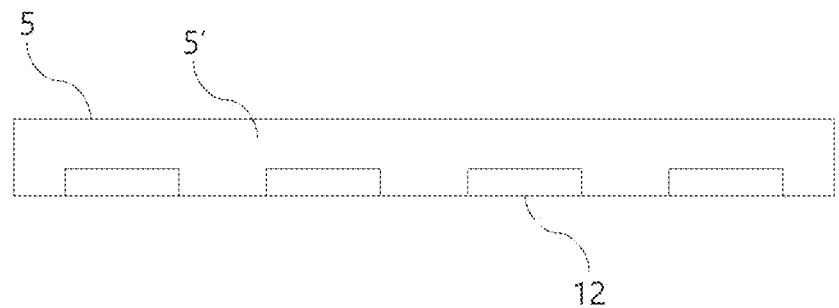
FIGS. 8A and 8B are a plan view and a sectional view of a reaction unit according to an embodiment of the present invention.

FIG. 8A is a plan view of a reaction unit according to an embodiment of the present invention, and FIG. 8B is a sectional view taken along the line of G-G' of FIG. 8A. Referring to FIG. 8A, the reaction unit 13 may include: an activation unit 14 in which a liquid-phase material introduced into the reaction unit 13 is electrolyzed; and an inactivation unit 15 located above the activation unit 14 so that a gas-phase material generated from the activation unit 14 stays.

Referring to FIG. 8B, the inactivation unit 15 may be the electrode plate 1 constituting the reaction unit 13, and the activation unit 14 may be provided from a lower end of the reaction unit 13 to a predetermined height. The activation unit 14 may be a metal-based plate, a sheet, a film, etc. coupled to a lower portion of the reaction unit 13 by welding, bonding, or the like, and/or a metal-based catalyst introduced into the lower portion of the reaction unit 13 by coating, doping, or the like.

In order to electrolyze the liquid-phase material filled in the reaction unit 13 only in the activation unit 14 provided under the reaction unit 13, it is necessary that the activation unit 14 and the inactivation unit 15 are respectively made of a metal material. For instance, the inactivation unit 15, that is, the electrode plate 1, may include titanium, stainless steel, or the like, and the activation unit 14 provided on the surface of the lower portion thereof may include platinum, iridium, or the like.

Since the activation unit 14 and the inactivation unit 15 respectively partition the lower portion and the upper portion of the reaction unit 13, the movement of the material through the third flow path 11 disposed on the side inner wall of the flow path guide 5 depends on the location, namely, the height thereof.

Since the liquid including the raw material and the electrolysis product introduced through the third flow paths 10 and 11 provided on the lower inner wall and the side inner wall of the flow path guide 5 may be filled up to the upper end of the activation unit 14 in the reaction unit 13 of the electrode plate 1, a lower area of the side inner wall of the flow path guide 5, namely, at least one side of the activation unit 14, preferably, the third flow path 11 disposed at both sides may be located under the surface of the liquid. A higher area, namely, at least one side of the inactivation unit 15, preferably, the third flow path 11 disposed at both sides may be located above the surface of the liquid.

At least one side of the activation unit of the side inner wall of the flow path guide 5, namely, the third flow path 11 located under the surface of the liquid together with the third flow path 10 disposed in the lower inner wall of the flow path guide 5 may provide a route in which raw materials introduced into the flow path guide 5 through the first flow path 7 moves to the activation unit 14 of the electrode plate, and provide a route in which a liquid-phase electrolysis product generated in the activation unit 14 moves into the flow path guide 5.

The liquid-phase electrolysis product moving into the flow path guide 5 moves upward into the second flow path 9 and the upper through hole 8 by pressure provided by the raw material introduced into the flow path guide 5 through the lower through hole 6 so as to be discharged out of the electrolyzer.

In addition, a portion of the liquid-phase electrolysis product moving into the flow path guide 5 may be circulated and returned to the activation unit 14 through the third flow path 10 disposed in the lower inner wall and/or at least one side of the activation unit 14 of the side inner wall, namely, the third flow path 11 located under the surface of the liquid. As described above, the present invention can enhance electrolysis efficiency by circulating a portion of the liquid-phase electrolysis product to the activation unit 14.

The third flow path 11 located on at least one side of the inactivation unit 15 of the side inner wall of the flow path guide 5, namely, located above the surface of the liquid, together with the third flow path 12 disposed on the upper inner wall of the flow path guide 5, may provide a route through which the gas-phase electrolysis product generated in the activation unit 14 moves into the flow path guide 5. The gas-phase electrolysis product moving into the flow path guide 5 may be discharged out of the electrolyzer through the second flow path 9 and the upper through hole 8.

In a case in which the lower portion and the upper portion of the reaction unit 13 are respectively partitioned into the activation unit 14 and inactivation unit 15, the upper inner wall and the surface of the liquid including the raw material and the electrolysis product filled in the reaction unit 13 may be spaced apart from each other at a predetermined interval, and a predetermined space may be formed in an upper end of the reaction unit 13, concretely, in the inactivation unit 15.

Such a space may allow the gas-phase product generated by the electrolytic reaction to be smoothly discharged through the third flow paths 11 and 12, the second flow path 9, and the upper through hole 8 which are disposed above the surface of the liquid.

The activation unit 14 may be filled with the liquid including the raw material and the electrolysis product introduced through the third flow path 10 disposed in the lower inner wall of the flow path guide 5.

In a case in which the level of the liquid becomes excessively high, a space in which the gas-phase electrolysis product generated in the activation unit 14 may be narrowed. Accordingly, it is difficult to control the internal pressure of the electrolyzer, and most of the third flow path 11 provided in the side inner wall of the flow path guide 5 may be submerged under the surface of the liquid. So, it is difficult to properly provide a route through which the gas-phase electrolysis product is discharged to the outside.

Therefore, the ratio of the area of the activation unit 14 to the area of the reaction unit 13 may be designed to be within a predetermined range so that a space for smoothly maintaining or discharging the gas-phase electrolysis product above the surface of the liquid filled in the activation unit 14 can be formed.

For example, the ratio of the area of the activation unit 14 to the area of the reaction unit 13 may be 0.1 to 0.9, preferably 0.2 to 0.8, more preferably 0.3 to 0.7.

According to another aspect of the present invention, the electrolyzer includes: an electrode structure; and a diaphragm provided to face one side of the electrode plate.

Referring to FIG. 3A, unit structures each including the components in order of "the cooling jacket 4-the cathode plate 1-the flow path guide 5-the diaphragm 2-the flow path guide anode plate 3" may be coupled in multiple stages to constitute an electrolyzer.

The movement and reaction of the material in the electrolyzer in which the unit structures are coupled in multiple stages may be exemplified as follows on the basis of a sodium hypochlorite generation process through electrolysis of salt water.

The salt water introduced into the flow path guide 5 provided along the circumference of one side of the anode plate 3 may be introduced into the activation unit of the anode plate through the third flow path provided in the lower inner wall of the flow path guide 5 and the third flow path provided in the lower area of the side inner wall.

Purified water introduced into the flow path guide 5 provided along the circumference of one side of the cathode plate 3 may be introduced into the activation unit of the cathode plate through the third flow path provided in the lower inner wall of the flow path guide 5 and the third flow path provided in the lower area of the side inner wall.

In a case in which a predetermined voltage is applied to the anode plate and the cathode plate, chlorine gas ($Cl_2$) is generated from the activation unit of the cathode plate, and sodium ions move to the activation unit of the cathode plate through the diaphragm so that caustic soda (NaOH) and chlorine gas ($H_2$) are generated from the activation unit of the cathode plate.

The chlorine gas ($Cl_2$) and other liquid-phase products generated from the activation unit of the cathode plate may move into the flow path guide through the third flow paths disposed in the side inner wall and the upper inner wall of the flow path guide 5, and then, may be discharged to the outside of the electrolyzer through the second flow path and the upper through hole.

The hydrogen gas, the caustic soda aqueous solution, and the other liquid products generated in the activation unit of the cathode plate may move into the flow path guide through the third flow paths disposed in the side inner wall and the upper inner wall of the flow path guide 5, and then, may be discharged to the outside of the electrolyzer through the second flow path and the upper through hole.

As described above, the electrode structure and the electrolyzer including the same include: an electrode plate; a cooling jacket provided on one side of the electrode plate to absorb heat generated by an electrolytic reaction; and a flow path guide provided on one side of the electrode plate along the circumference of the electrode plate to provide an inflow path of a material with respect to the electrolyzer, thereby simplifying the electrolyzer and the facility including the electrolyzer as a whole, and minimizing the exposure of the pipe for transferring and/or circulating the material to the outside, thereby facilitating maintenance and management and reducing the risk of accidents and damage.

The above description of the present disclosure is just for illustration, and a person skilled in the art will understand that the present disclosure can be easily modified in different ways without changing essential techniques or features of the present disclosure. Therefore, the above embodiments should be understood as being descriptive, not limitative. For example, any component described as having an integrated form may be implemented in a distributed form, and any component described as having a distributed form may also be implemented in an integrated form.

The scope of the present disclosure is defined by the appended claims, rather than the above description, and all changes or modifications derived from the meaning, scope and equivalents of the appended claims should be interpreted as falling within the scope of the present disclosure.

EXPLANATION OF REFERENCE NUMERALS

1: Cathode plate (or cathode chamber)
2: Diaphragm
3: Anode plate (or anode chamber)
4: Cooling jacket
5: Flow path guide
5': Inner wall of flow path guide
6: Lower through hole
7: First flow path
8: Upper through hole
9: Second flow path
10, 11, 12: Third flow path
13: Reaction unit
14: Activation unit
15: Inactivation unit

The invention claimed is:
1. An electrode structure comprising:
an electrode plate;
a flow path guide disposed on one side of the electrode plate along the circumference of the electrode plate;
a lower through hole passing through the electrode plate and the flow path guide at a lower portion thereof;
a first flow path allowing the flow path guide and the lower through hole to communicate with each other;
an upper through hole passing through the electrode plate and the flow path guide at an upper portion thereof;
a second flow path allowing the flow path guide and the upper through hole to communicate with each other;
a reaction unit in which the flow path guide is not provided on one side of the electrode plate; and
a third flow path allowing the reaction unit and the flow path guide to communicate with each other, which is provided in at least one of a lower inner wall, a side inner wall, and an upper inner wall of the flow path guide,
wherein the reaction unit includes an activation unit in which a liquid-phase material introduced into the reaction unit through the third flow path disposed in the lower inner wall of the flow path guide is electrolyzed, and an inactivation unit located above the activation unit so that a gas-phase material generated from the activation unit stays,
wherein the third flow path located under the surface of the liquid-phase material provides a route through which raw material introduced into the flow path guide through the first flow path moves to the activation unit, a route through which a liquid-phase electrolysis product generated in the activation unit moves into the flow path guide, and a route through which a portion of the liquid-phase electrolysis product moving into the flow path guide is circulated and returned to the activation unit,
wherein the third flow path located above the surface of the liquid-phase material provides a route through which the gas-phase material moves into the flow path guide.

2. The electrode structure according to claim 1, further comprising:
a cooling jacket disposed on the other side of the electrode plate.

3. The electrode structure according to claim 2, wherein the electrode plate and the cooling jacket are made of the same material.

4. The electrode structure according to claim 1, wherein an area ratio of the third flow path to the inner wall of the flow path guide is 0.05 to 0.95.

5. The electrode structure according to claim 1, wherein a ratio of the area of the activation unit to the area of the reaction unit is 0.1 to 0.9.

6. An electrolyzer comprising:
an electrode structure according to claim 1; and
a diaphragm disposed to face one side of the electrode plate.

* * * * *